United States Patent [19]

Hazenbroek

[11] Patent Number: 4,597,136

[45] Date of Patent: Jul. 1, 1986

[54] ON-LINE WING REMOVAL SYSTEM

[76] Inventor: Jacobus E. Hazenbroek, Burg de Zeeuwstratt 52, Numansdorp, Netherlands

[21] Appl. No.: 627,226

[22] Filed: Jul. 2, 1984

[30] Foreign Application Priority Data

Jan. 18, 1984 [NL] Netherlands .................. 8400163

[51] Int. Cl.$^4$ ............................................. A22C 21/00
[52] U.S. Cl. .......................................... 17/52; 17/11
[58] Field of Search ..................................... 17/11, 52

[56] References Cited

U.S. PATENT DOCUMENTS

| | | | |
|---|---|---|---|
| 2,941,238 | 6/1980 | Reeves | 17/11 |
| 3,942,222 | 3/1976 | Strandine et al. | 17/45 |
| 4,016,624 | 4/1977 | Martin et al. | 17/11 |
| 4,271,561 | 6/1981 | Lewis | 17/11 |
| 4,354,296 | 10/1982 | Robinson | 17/52 |
| 4,424,608 | 1/1984 | Martin | 17/52 |

Primary Examiner—Willie G. Abercrombie
Attorney, Agent, or Firm—Thomas & Kennedy

[57] ABSTRACT

Wings are automatically severed from birds while the birds are suspended inverted from shackles in a commercial poultry processing line. This is done by guiding the wing elbow joints with guide bars and directly pushing the torso between a pair of cutting blades. In this manner the balls and sockets of the shoulder joints are dislodged whereby the blades pass therebetween without chipping bone fragments from the shoulder joints.

18 Claims, 5 Drawing Figures

ON-LINE WING REMOVAL SYSTEM

TECHNICAL FIELD

This invention relates generally to a method and apparatus for severing wings from the carcasses of chickens or other types of poultry, and particularly to a method and apparatus for automatically severing the wings from the torsos or cascasses of birds as the birds are being conveyed by an overhead conveyor in a poultry processing line.

BACKGROUND OF THE INVENTION

Retail grocery stores and fast food restaurants purchase for resale specified pieces of fowl such as chicken breasts, wings, and legs. To meet this commercial demand, poultry is dismembered automatically in commercial poultry processing plants and the various pieces are packaged and sold separately or collectively.

Heretofore, chicken wings have been severed from the torsos of previously eviscerated poultry with rotary blade means. U.S. Pat. No. 2,941,238 discloses an early concept of using a rotary blade wherein the shoulder joint of a chicken is laid upon a slotted rod along which a rotary blade is passed. In this case the wings were to be completely severed from the torso. In other cases, such as the procedure disclosed in U.S. Pat. No. 3,942,222, the muscle that overlies the ball and socket of the shoulder joint of a bird is to be cut without complete severence of the wings from the torso so as to enable the wings to be folded in a manner to facilitate packaging. Stationary blades are disclosed as being used to effect the cutting action.

More recently, in an attempt to increase process speed, various rotary knives, rotary saws and pivoting blades have been used to sever poultry wings from the carcasses; however, there is still the hazzard of leaving in the meat pieces of loose bone cut from the joints. Since bone fragments are difficult to observe and to remove, they usually have been left in the meat with the possibility of their being encountered upon the product being eaten by a consumer.

In an attempt to reduce the risk of the creation of bone fragments in cut-up poultry, machines similar to that illustrated in U.S. Pat. Nos. 4,016,624 and 4,424,608 were devised. With these machines the birds were to be removed from the overhead conveyor after the birds had been eviscerated and the backs of the carcasses were to be carried on a conveyor for movement through a succession of dismembering stations in an automated processing line. Stationary knifes provided adjacent the path of movement of the birds severed the main tendon between each of the inner ends of the wing stubs and the back which holds the ball on the inner end of the wing stub operable within the socket. The severence of this tendon by the blade at each side of the carcass was to be done in a manner proportedly to eliminate the possibility of objectionable bone chips being formed during the severance operation. However, in processing poultry in this manner, each bird must be removed from the overhead conveyor and individually carried through the processing station.

Although the dismembering of birds as they move on an overhead conveyor has been attempted in the past, as disclosed in U.S. Pat. Nos. 4,271,561 and 4,354,296, the automatic removal of wings from the poultry carcasses as the birds remain suspended from an overhead conveyor generally has been unsuccessful.

Obviously it would be a distinct advance in the art if a method and an apparatus were devised for severing the wings from the carcasses of poultry without substantial creation of bone chips from the shoulder joints, without having to dismount the birds from their shackles and to remount them on a conveyor of another machine for the wing severence step, and in a manner permitting breast meat to be deboned in full butterfly with tendons intact. Unfortunately, such a process and apparatus for automatically performing such a process has heretofore eluded the industry in view of the difficulty in precisely presenting shoulder joints to cutting blades of birds that are swinging free from overhead shackles. Accordingly, it is the provision of such a method and apparatus to which the present invention is primarily directed.

SUMMARY OF THE INVENTION

Briefly described, the present invention comprises a method and an apparatus for severing the wings from the carcasses of birds as the birds are conveyed suspended in an inverted attitude from shackles of an overhead conveyor system in a poultry processing line. A lower conveyor is mounted beneath the overhead conveyor system for movement along an endless path that includes an upper flight that passes through a generally vertical plane in the same direction as and in timed relation with the movement of the overhead conveyor. A plurality of mutually spaced bird engaging push bars are mounted to the lower conveyor so as to extend upwardly from the conveyor as they move along the upper flight path in the same direction as the shackles of the overhead conveyor system. A pair of vertically spaced stationary guide bars is mounted above the upper flight path to one side of the vertical plane and another pair of vertically spaced guide bars is mounted above the upper flight path to the other side of the vertical plane. A pair of rotary cutting blades is mounted along the upper flight of the conveyor, with the rotary cutting blades positioned on opposite sides of the vertical and plane adjacent the two pairs of guide bars.

The apparatus performs the process of severing the wings from the torsos of birds as the birds are moved in series along an overhead conveyor system toward a pair of blades that straddle the path of torso travel. The process comprises the steps of conveying the wings into guiding contact between two pairs of vertically spaced guide bars that straddle the vertical plane of torso travel whereupon frictional drag imparted by the guide bars to the wings causes the torso to tilt backwardly from the shackle. As the wings are guided by the guide bars the torso of each bird is directly pushed by the lower conveyor between the blades so as to reduce the backward tilt of the breast portion of the torso and to spread the wings from the torso. The wings-to-torso shoulder joints are then brought into severing contact with the blades.

The friction applied by the guide bars to the wings and the force applied by the lower conveyor to each bird cause the wings to be spread from the torso sufficiently to cause the balls of each wing shoulder joint to be urged from their sockets as the joints reach the blades. The joints are then guided through the blades such that the blades pass between the dislodged balls and sockets and the through the muscles trailing the joint. As the blades begin to cut into the tissue of the wing joints, the balls of the joints tend to immediately pull out of the sockets so that the blades pass between the balls and sockets and avoid cutting engagement with the bone surfaces of the joint.

Thus, it is an object of this invention to provide an on-line wing cutting method and apparatus which removes the wings of the birds from their carcasses as the birds move in series along an overhead conveyor system.

Another object of the invention is to provide an inexpensive and reliable apparatus that removes wings from poultry carcasses as the carcasses are moved in series along an overhead conveyor system.

Other objects, features advantages of the invention will become apparent upon reading the following specification when take in conjunction with the accompanying drawings.

DETAILED DESCRIPTION

Figure 1:
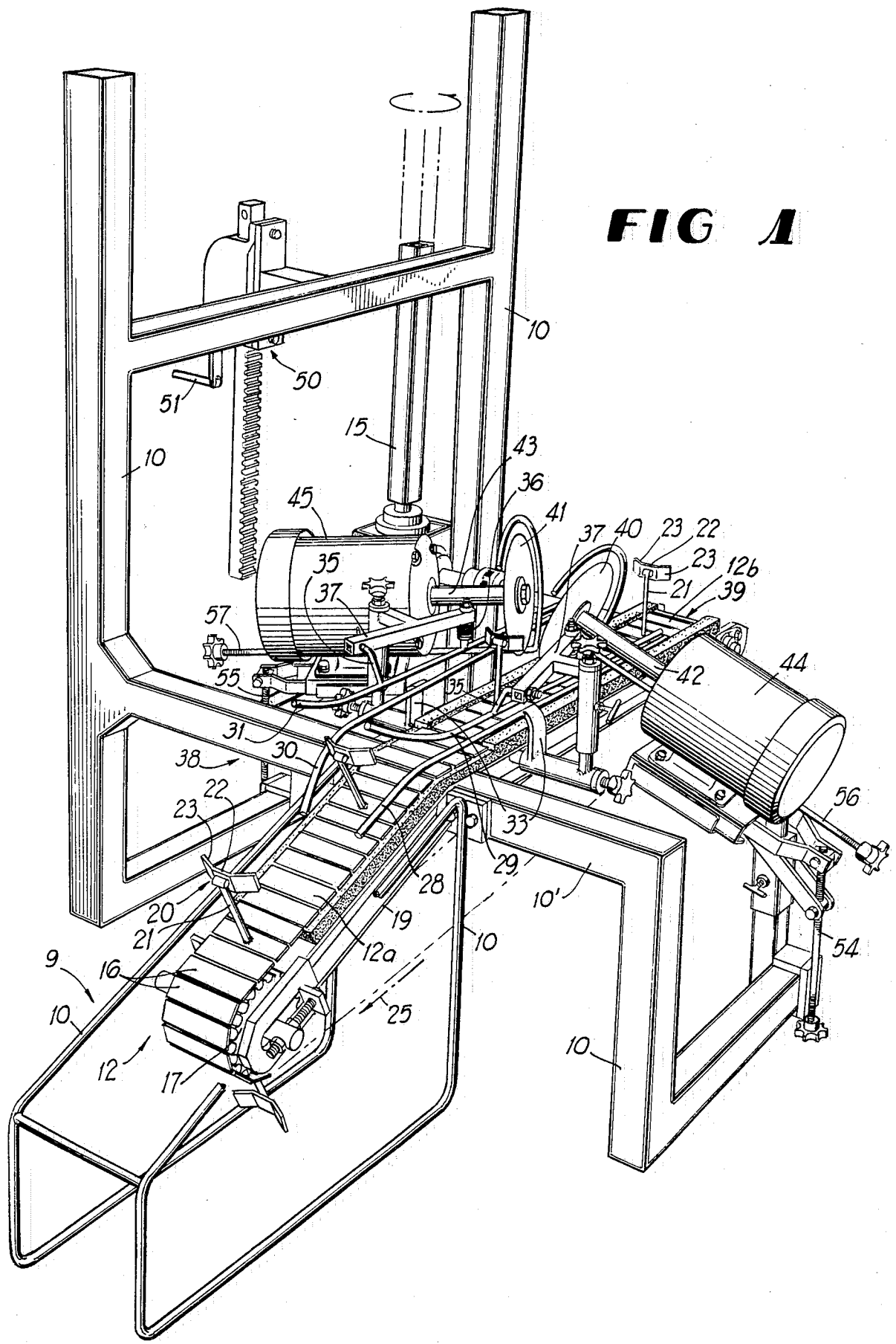
FIG. 1 is a perspective view of apparatus embodying principles of the present invention which can be used in practicing a method of the invention.
Figure 2:
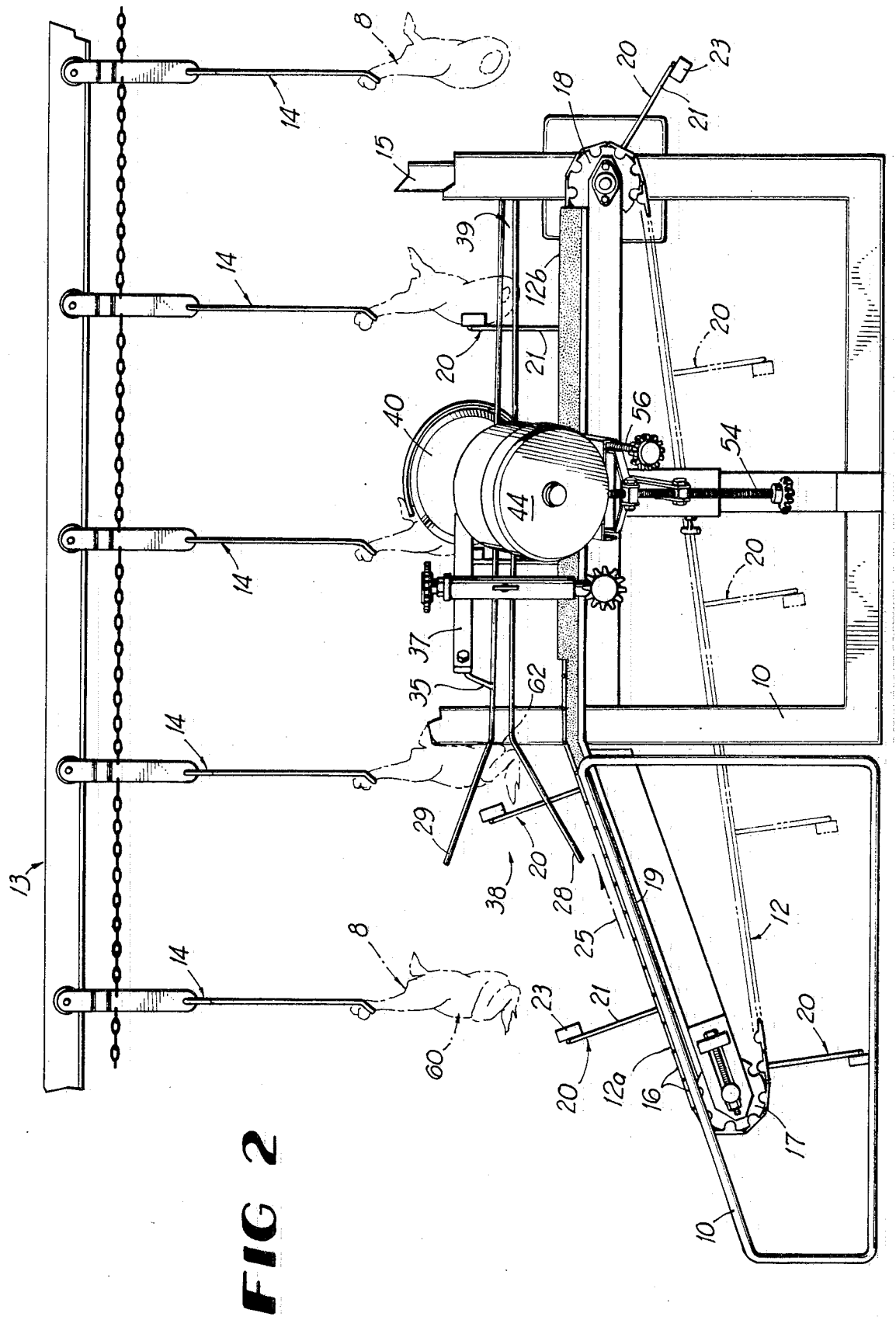
FIG. 2 is a simplified side elevational view of the apparatus shown in FIG. 1 showing its position for operation in conjunction with an overhead conveyor.

Referring now in more detail to the drawing, in which like numerals indicate like parts throughout the several views, FIGS. 1 and 2 illustrate the wing severing apparatus 9 which includes a frame 10 which supports an endless conveyor indicated generally at 12 beneath an overhead conveyor 13 from which a plurality of regularly spaced shackles 14 depend. The conveyor 12 is driven by a take-off drive mechanism linked in the conventional relationship with the overhead conveyor 13 which mechanism includes a rotatable link bar 15. The conveyor here is a flat Veyor type conveyor that has a chain of flat links 16 which are routed over two idler sprockets 17 and 18 so as to move along an endless path that has an upper flight and a lower flight between the two sprockets. Sprocket 17 is located at an elevation below the sprocket 18 while a midportion of the conveyor chain is routed over a transverse frame beam 10' whereby this upper flight of the endless conveyor path has both inclined 12a and level 12b portions.

The conveyor 12 includes a set of bird engaging T-bars or T-plates indicated generally at 20, each T-bar comprising a stanchion 21 and a crossbar 22. The lower end of each stanchion 21 is mounted rigidly to the center of a conveyor link 16 while the crossbar 22 is mounted to the other end of the stanchion. The crossbar 22 has lateral end portions 23 that are inturned in the direction of conveyor movement indicated by arrow 25 so as to conform to the torso of the chicken, specifically either to chicken backs or to chicken breasts. The bird engaging T-bars 20 are mounted for endless travel in a vertical plane 27 beneath the centers of conveyor shackles 14, as most clearly shown in FIG. 3 up the inclined portion 12a of the upper run of the conveyor, then along the horizontal portion 12b, and finally along the return run.

As illustrated in FIG. 1, the apparatus includes a lower guide bar 28 and an upper guide bar 29 mounted one above the other as a pair to one side of vertical plane 27 and another lower guide bar 30 and upper guide bar 31 mounted one above the other as a pair to the other side of plane 27. The lower guide bars 28 and 30 are rigidly mounted to frame support members 33 while the upper guide bars 29 and 31 are mounted to relatively small frame bars 35 and biased against compression springs 36 which are supported beneath a frame crossarm 37. The pair of guide bars 28/29 and the pair of guide bars 30/31 are mounted at a slightly skewed angle with respect to the vertical plane 27 (FIG. 3) whereby they diverge slightly away from the plane as they extend from their Y-shaped entry end towards their rear ends indicated generally at 39.

A pair of rotary disk blades 40 and 41 are mounted to the ends of rotary shafts 42 and 43 which are driven by fractional horse power electric motors 44 and 45, respectively. It will be noted that the shafts 42 and 43 are located along shaft axes which are inclined as they extend from their respective motors towards the disk blades. It will also be seen that the shafts are not perpendicular to the path of travel of the conveyor but rather are cocked at a sight acute angle contra to the direction of conveyor movement. This is done in order to position the rotary cutting blades 40 and 41 closely adjacent and between the two pairs of guide bars for making clean, high speed cuts through the shoulder joints of birds as hereinafter described. Preferably, the rotary blades are driven at a speed of some 1725 rpm although other speeds may be employed.

Finally, several adjustment mechanisms are provided for altering the positions of the various elements of the apparatus. As shown in FIG. 1, these adjustments include a rack and pinion assembly shown partially at 50 for altering the elevation of the entire apparatus with respect to the overhead conveyor by rotation of a crank 51. For clarity only a portion of this adjustment mechanism is illustrated in the detailed FIG. 1. Vertical screw adjustments 54 and 55 are provided for altering the tilt of the cutting blades and their associated motor assembly while inclined screw adjustments 56 and 57 are provided for changing the proximity of the cutting blades, one to the other.

In operation, the wing severing apparatus 9 illustrated in FIG. 1 is positioned beneath the overhead conveyor that carries the shackles 14 at preselected intervals. Preferably, the spacing of the bird engaging crossbars 20 on the lower conveyor 12 matches the spacing of the shackles. Poultry, such as chickens 8 are suspended by their hocks from the shackles successively in a poultry processing line and then killed, defeathered and eviscerated prior to reaching the wing severing apparatus 9.

Figure 3:
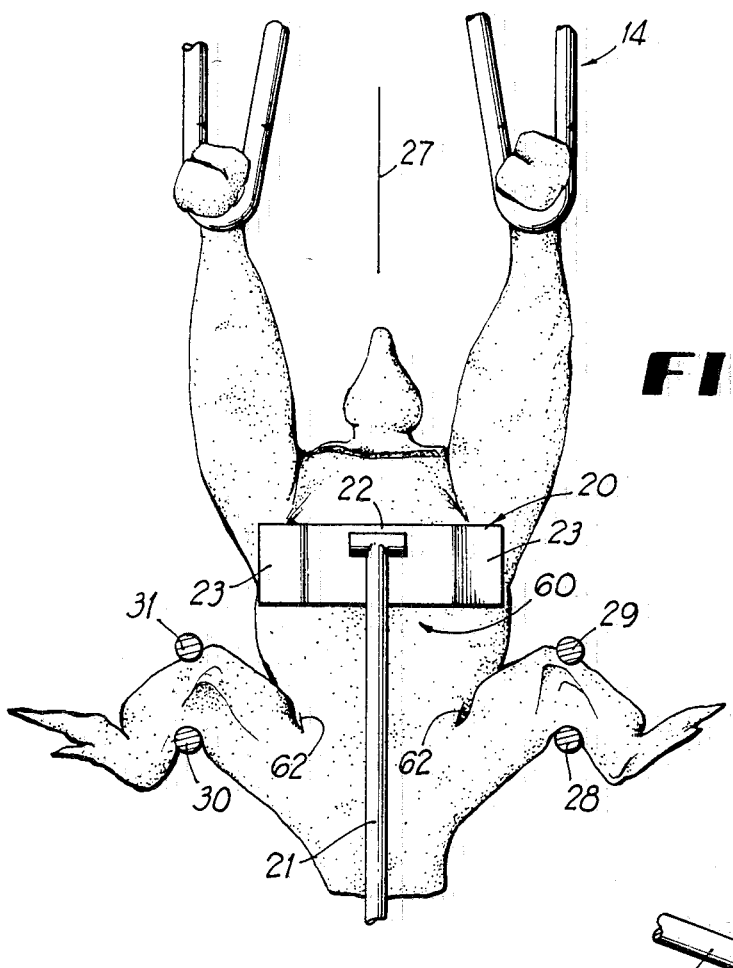
FIG. 3 is a front view of an eviscerated chicken suspended from a shackle while being guided by the guide bars of the apparatus shown in FIG. 1 as viewed facing the direction of conveyor movement.

As each bird approaches the wing severing apparatus, the shackles 14 preferably are positioned to move the birds backwardly through the wing cutting station although the opposite orientation may be employed. As an individual bird 8 approaches the station at the Y-shaped entries of the two pairs of guide bars 28, 29 and 30, 31, a T-bar 20 will trail each bird as the T-bar moves along the inclined portion of the conveyor upper flight path and the T-bar will move up the inclined portion 12a of the conveyor until its cross bar 22 is behind a bird 8. The two wing elbow joints then pass into engagement with the guide bars 28-31 as shown in FIG. 3. That the upper guide bars 29 and 31 are spring biased toward lower guide bars 28 and 30 enables the elbow joints of variously sized birds to be slidably held and guided.

Figure 4:
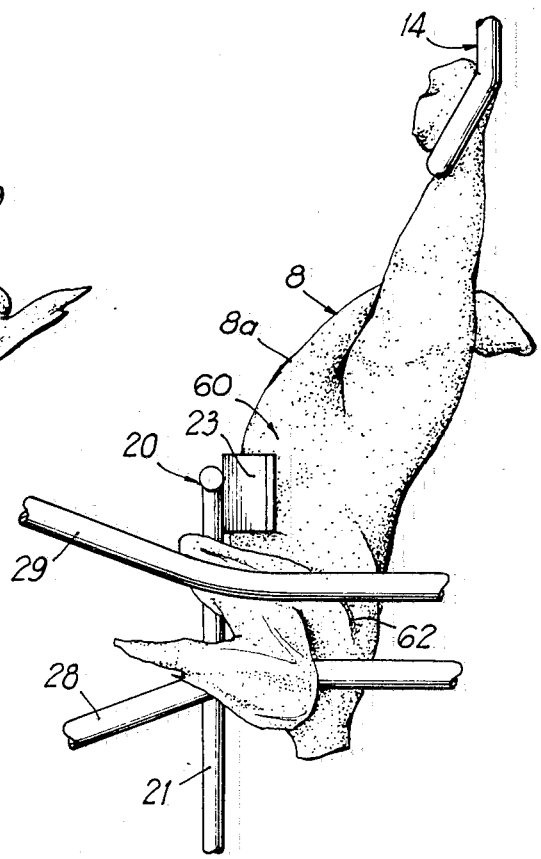
FIG. 4 is a side view of the chicken being guided by the guide bars towards the shoulder joint severing blades of the apparatus shown in FIG. 1 illustrating a backward tilt imparted by the apparatus guide bars.
Figure 5:
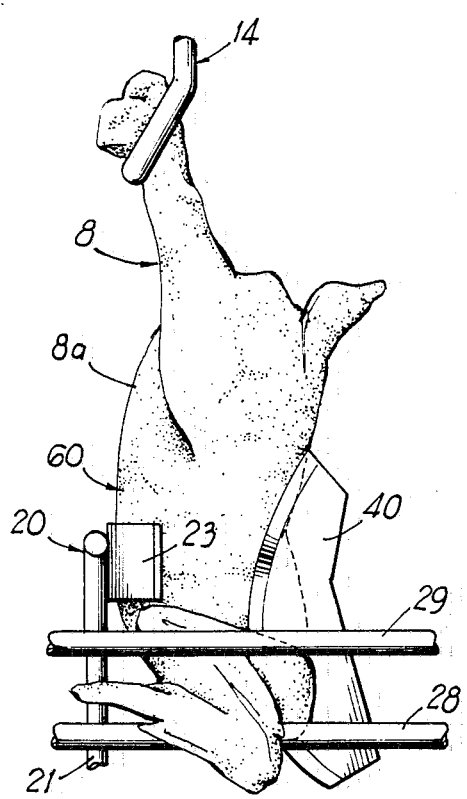
FIG. 5 is a side view of the chicken as it contacts the severing blades of the apparatus shown in FIG. 1.

As the pairs of guide bars diverge the wings are spread laterally apart from the torso 60 of the bird. This action of the guide bars produces a frictional drag on the bird whereupon the bird is tilted backwardly somewhat as shown in FIG. 4 prior to its having reached the vicinity of the cutting blades 40 and 41. At this point, however, a T-bar 20 just to the rear of the bird, now entering the level portion 12b of the upper flight of the conveyor, engages the breast 8a of the bird as shown in FIG. 4, at a height between the upper and lower peripheral height limits of the blades, and actually begins to accelerate the lower portion of the bird with respect to its upper portion. This action, in conjunction with the mutual divergence of the two pairs of guide bars 28-31, serves to pull the shoulder joints 62 of the bird further away from the torso and breast, so as to present the minor pectoral muscle to the cutting blades 40 and 41. The high speed cutting blades 40, 41 then make quick cuts through the muscle whereupon the wing is permitted to be pulled backward rapidly by the combined action of the two pairs of guide bars 28-31 and the bird engaging T-bar whereupon the balls are dislodged from the sockets of the shoulder joints. Immediately thereafter the cutting blades pass through the shoulder joints between the now dislodged balls and sockets and then cuts through the trailing muscles to effect a complete severance of the two wings from the torso. The wings are then dropped into an unshown drop zone adjacent to the apparatus while the remainder of the carcass is continued to be transported down line for further processing while suspended from the overhead conveyor 13 and with the meat that had extended over the shoulder joints now rolled onto the breast. Later the breast meat may be deboned in full butterfly.

It thus is seen that a method and apparatus is now provided for severing the wings from the torso of birds as they are being conveyed by an overhead conveyor through a poultry processing line. The severence is effected in such a manner that clean cuts are made through the joints with minor risk of the cutting blades cutting a significant amount of bone from the shoulder joints. It should, however, be understood that the just described embodiment merely illustrated principles of invention in a preferred form. Many additions and deletions may, of course, be made thereto without departure from the spirit and scope of invention as set forth in the following claims.

What is claimed is:

1. Apparatus for severing the wings from the carcasses of birds as the birds are conveyed suspended invertedly from shackles in a poultry processing line, and with said apparatus comprising, in combination, a conveyor mounted for movement along an endless path that includes movable upper and lower flights with the upper flight positioned below and extending approximately parallel to the processing line, a plurality of mutually spaced bird engaging push bars mounted at intervals to the flights of said conveyor so as to extend upwardly from the upper flight of said conveyor as the upper flight moves beneath the processing line, means for moving the upper flight of said conveyor in timed relationship with the movement of the shackles of the processing line so that the push bars each move with and in position behind a bird carried by a shackle so as to push the carcass of the bird along the processing line, a pair of vertically spaced guide bars mounted above said upper flight on one side of said upper flight and another pair of vertically spaced guide bars mounted above said upper flight on the other side of said upper flight with said pairs of vertically spaced guide bars positioned to recieve, guide and apply friction to the wings of the birds moving along the upper flight, and a pair of rotary cutting blades mounted along opposite sides of said upper flight adjacent said pairs of guide bars, whereby as the birds are carried by the shackles of the processing line the guide bars receive, guide and apply friction to the wings of the birds and tend to tilt the birds away from the direction of movement of the upper flight and the push bars push against the carcasses of the birds to urge the birds in the direction of movement of the upper flight and control the tilt of the birds and the cutting blades cut between the wings and the carcasses of the birds.

2. The apparatus of claim 1 wherein each of said bird engaging push bars is generally T-shaped.

3. The apparatus of claim 2 wherein each of said T-shaped push bars has a stanchion mounted at one end to said conveyor and a crossarm mounted to the other stanchion end, and wherein said crossarm has mutually in-turned bird engaging end portions.

4. The apparatus of claim 2 wherein said T-shaped push bar has a crossarm mounted to said conveyor at a height such as to pass between said pair of rotary cutting blades.

5. The apparatus of claim 1 for use with a poultry processing line having a plurality of shackles spaced apart a preselected distance, and wherein said bird engaging push bars are mutually spaced by distances approximately equal to said preselected distance.

6. The apparatus of claim 1 where said pairs of guide bars diverge slightly away from said upper flight as said guide bars extend toward said pair of cutting blades.

7. The apparatus of claim 1 wherein the upper guide bar of each of said pairs of guide bars is mounted for pivotal movement in engagement with a spring.

8. The apparatus of claim 1 wherein each of said cutting blades is disk-shaped and mounted for rotary movement about an axis.

9. The apparatus of claim 8 wherein each of said blade axes is located along an incline that extends obliquely over a pair of said guide bars.

10. A method of severing the wings from the carcass of a bird as the bird is conveyed suspended invertedly from a shackle in a poultry processing line towards a pair of blades that straddle the path of carcass travel, and with the method comprising the steps of conveying the wings into guiding contact between two pairs of vertically spaced wing guide bars that straddle the path of carcass travel whereupon frictional drag is imparted by the guide bars to the wings causing the carcass to tilt backwardly from the shackle, and as the wings are guided by the guide bars directly pushing the carcass between the blades so as to control the backward tilt of the breast portion of the carcass as it is supported by the shackle and to spread the wings from the carcass and to bring the wings-to-carcass shoulder joints into severing contact with the blades.

11. The method of claim 10 wherein the step of conveying the wings into guiding contact between two pairs of guide bars comprises conveying the wing elbow joints into guiding contact with and between the guide bars.

12. The method of claim 11 and further including the step of guiding the wing elbow joints by the guide bars away from the carcass as the carcass approaches the blades.

13. The method of claim 12 and further comprising the step of pushing the carcass sufficiently to cause the ball and socket of each shoulder joint to dislodge prior to shoulder joints making severing contact with the blades.

14. A method of severing the wings from the carcass of a bird as the bird is conveyed suspended invertedly from a shackle in a poultry processing line towards a pair of blades that straddle the path of torso travel, and with the method comrising the steps of applying guiding frictional contact with guide bars to the wings so as to spread the wings from the carcass sufficiently to cause the balls of each wing shoulder joint to be dislodged from its socket as the joints reach the blades and to tend to tilt the carcass backwards from the direction of travel, pushing the carcass in the direction of travel to control the tilt of the carcass, and as the wings are spread and the tilt of the carcass is controlled cutting with the blades through the shoulder joints such that the blades pass between the dislodged balls and sockets and then through the muscles trailing the balls and sockets.

15. The method of claim 14 wherein the bird is conveyed invertedly and backwardly as the shoulder joints are guided through the blades whereby the minor pectoral muscle is cut by the blades in facilitating wing spread and joint ball and socket dislodgment just prior to passage of the blades between the disjoined balls and sockets.

16. Apparatus for removing wings from poultry as a plurality of birds are moved in an inverted attitude in sequence along a processing path by a series of equally spaced shackles of an overhead conveyor system, said apparatus comprising a lower conveyor for positioning beneath and in alignment with the overhead conveyor, drive means for connection between the overhead conveyor and said lower conveyor for driving said lower conveyor in timed relationship with respect to the overhead conveyor, said lower conveyor having an upper flight and a series of equally spaced pusher elements moveable along said upper flight in timed relationship with the shackles of the overhead conveyor for engaging and pushing the birds suspended from the shackles along the processing path, pairs of guide bars positioned on opposite sides of the processing path, each pair of guide bars being constructed and arranged to engage and stretch the wings of the birds as the birds are pushed by said pusher elements, and wing cutting means positioned on opposite sides of the processing path and arranged to cut through the joints between the wings and the carcass of the birds as the birds are pushed by said pusher elements and as the wings of the birds are engaged and stretched by said guide bars.

17. The apparatus of claim 16 and wherein the guide bars of each pair of guide bars are biased together.

18. The apparatus of claim 16 and wherein the upper flight of said lower conveyor includes an upwardly inclined portion on which the pusher elements move upwardly between adjacent ones of the birds suspended on the overhead conveyor line, and a substantially horizontal portion on which the pusher elements engage and push the birds.

* * * * *